C. E. BROWN.
GRAIN SAVING TAIL BOARD.
APPLICATION FILED DEC. 13, 1917.
1,355,383.
Patented Oct. 12, 1920.
2 SHEETS—SHEET 1.
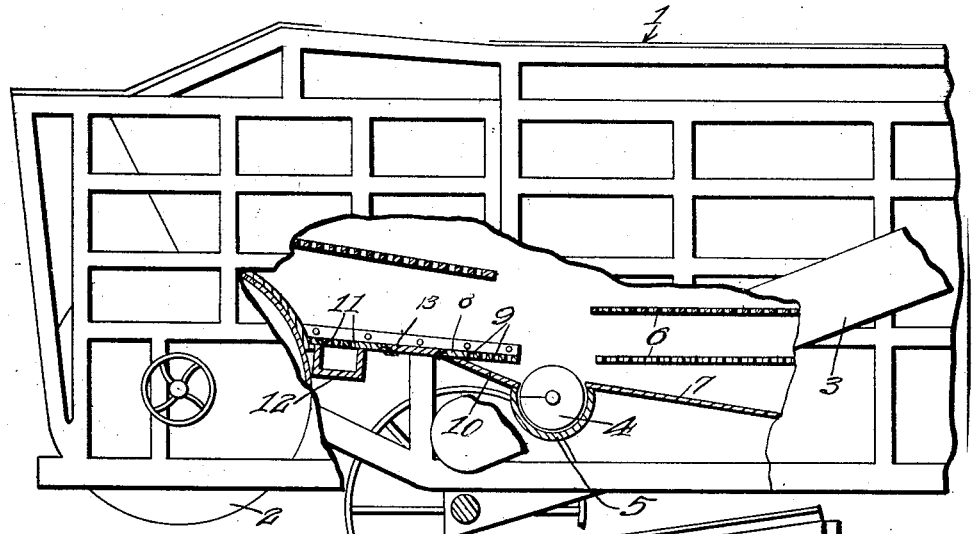
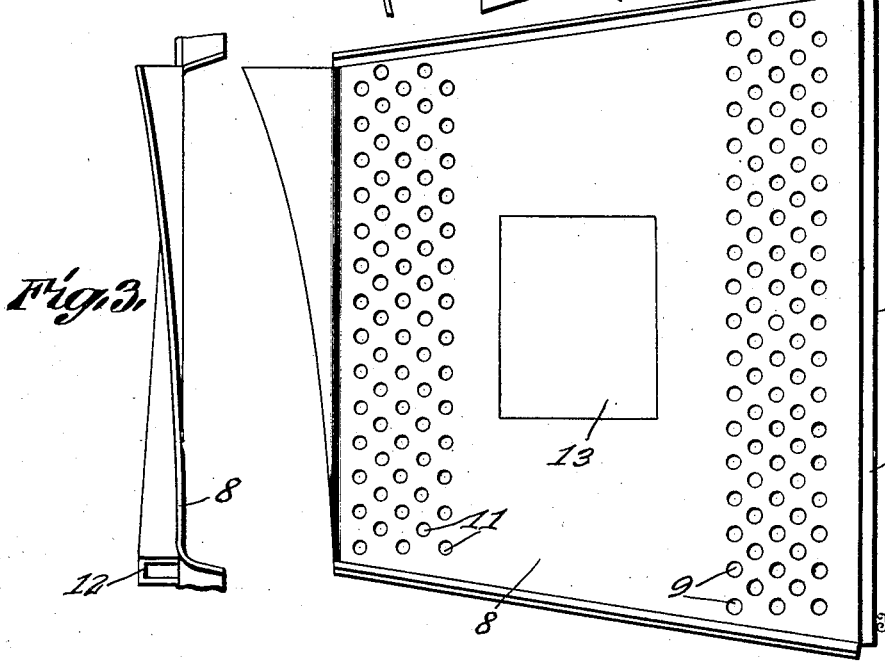

C. E. BROWN.
GRAIN SAVING TAIL BOARD.
APPLICATION FILED DEC. 13, 1917.
1,355,383.
Patented Oct. 12, 1920.
2 SHEETS—SHEET 2.
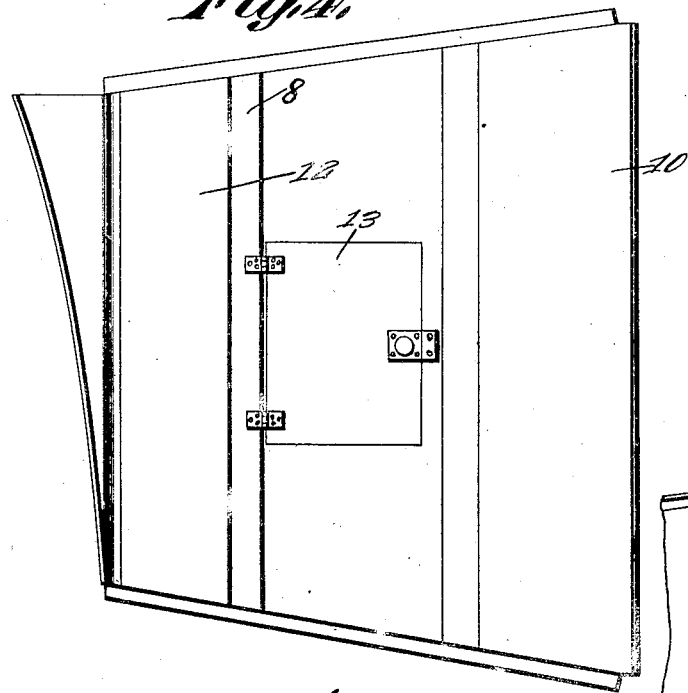
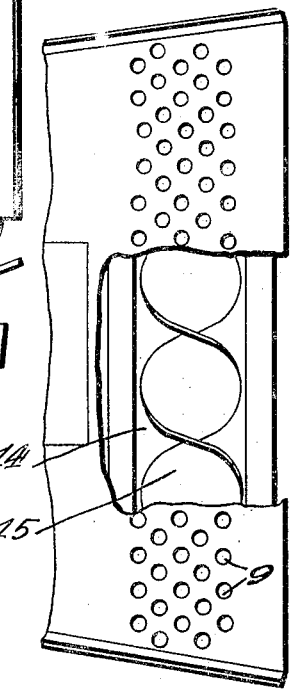
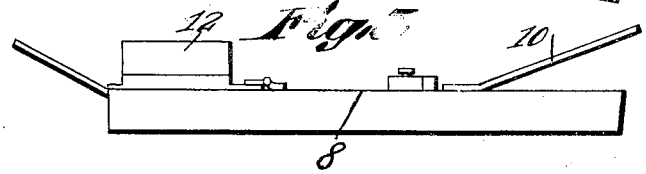
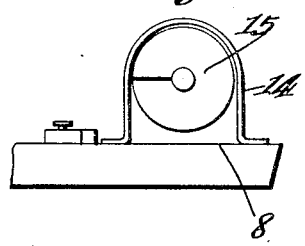
Inventor
C. E. Brown
Witness

UNITED STATES PATENT OFFICE.

CHARLIE E. BROWN, OF FINDLAY, OHIO.

GRAIN-SAVING TAIL-BOARD.

1,355,383.  Specification of Letters Patent.  Patented Oct. 12, 1920.

Application filed December 13, 1917. Serial No. 206,984.

*To all whom it may concern:*

Be it known that I, CHARLIE E. BROWN, a citizen of the United States, residing at Findlay, in the county of Hancock and State of Ohio, have invented a new and useful Grain-Saving Tail-Board, of which the following is a specification.

The subject of this invention is a tail board for grain separators or the like, and the objects of the invention are, first, to produce a tail board which will catch the grain or the like which is being carried over with the chaff or waste, second, to produce a tail board which will catch heavy substances such as grain and return it to the separator, third, to produce a tail board which has double means for catching substances being carried over with the waste, fourth, to provide a simple, durable and efficient tail board.

With the foregoing and other objects in view, which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

A practical embodiment of the invention is shown in the accompanying drawings, wherein:—

Figure 1 is a fragmentary view in side elevation partly in section, of the separator constructed in accordance with the invention;

Fig. 2 is a plan view of the tail board;

Fig. 3 is an end elevation of the same;

Fig. 4 is a bottom plan view;

Fig. 5 is a side elevation;

Fig. 6 is a fragmentary plan view of a modified form, parts broken away;

Fig. 7 is a side elevation of the same.

Referring to the drawings by numerals of reference:—

An ordinary form of separator is indicated generally at 1 which is provided with a fan chamber 2 in which turns a fan to produce a current of air to suck chaff and straw to the chamber and expel it through the usual blower spout, not shown.

The tailings elevator is indicated at 3 into which the tailings screw or auger 4, working in the trough 5, discharges. Separator screens are indicated at 6 and, beneath them the bottom or grain board 7 which has its rear edge positioned to allow chaff and the like, drawn therefrom, to pass over the tailings auger.

The tail board 8 is placed to the rear of the tailings auger 4, as is usual, and has its forward end parallel with and adjacent to the auger. This forward end is provided with a series of perforations 9 which, while here shown as of circular formation, may be of any desired shape and style. Below the tail board 8, and extending transversely thereof, is an inclined apron 10 which has its forward edge soldered or otherwise suitably secured to the tail board 8, while its forward edge is attached to or rests upon the edge of the trough 5. This apron underlies the perforations 9.

Perforations 11 are also formed adjacent the rear edge of the tail board 8 and a trough or spout 12 underlies these perforations and is secured to and extends transversely of the tail board. This spout 12 is inclined as shown to deliver material to one side of the tail board. To permit of proper inspection, a trap door 13 may be provided in the tail board, it being possible for an operator to stand on the ground with his body in the opening left by the open trap door.

In Figs. 6 and 7 a modification is shown in which the apron 10 is removed and a trough 14 secured to the under side of the tail board in place of such apron. Within the trough 14 an auger 15 works which delivers material to the tailings elevator to be passed again through the separator.

In practice the grain is fed to the separator in the usual manner, the chaff being drawn over the tailings screw and onto the tail board, and material also dropping from the straw onto the tail board. The heavier particles of this material which have gravitated to the bottom will fall directly into the trough 5 or through the perforations 9 or 11 and the good grain therein conveyed with the other tailings upwardly to the feed end of the machine by the elevator 3 and again subjected to the separating action with the result that practically all of the grain will be saved.

When the modified form is used the grain or other material which passes through the perforations 9 does not gravitate to the regular tailings auger but falls into the trough 14 and is carried by the auger to the tailings elevator.

It is of course understood that the holes 11 at the rear end of the tail board could be done away with without interfering with the working of the other part of the tail board.

Having thus described the invention, what is claimed as new and sought by Letters Patent is:—

1. In a grain separator a trough for the reception of tailings, a grain board inclined downwardly away from one side of the trough, a grain board inclined upwardly away from the other side of the trough, superposed screens extending over the downwardly inclined grain board and terminating above one side of the trough, a tail board extending beyond and above the other side of the trough and having a screen portion projecting over the upwardly inclined grain board, said tail board being arranged to receive tailings projected over the trough from the first named screens, and having an imperforate area, a removable closure mounted within said imperforate area, and accessible from beneath the separator, said closure being removable to permit the insertion of the body of an operator.

2. In a grain separator a trough for the reception of tailings, a grain board inclined downwardly away from one side of the trough, a grain board inclined upwardly away from the other side of the trough, superposed screens extending over the downwardly inclined grain board and terminating above one side of the trough, a tail board extending beyond and above the other side of the trough and having a screen portion projecting over the upwardly inclined grain board, said tail board being arranged to receive tailings projected over the trough from the first named screens and having an imperforate area.

In testimony that I claim the foregoing as my own, I have hereto affixed my signature in the presence of two witnesses.

CHARLIE E. BROWN.

Witnesses:
　EDITH D. BROWN,
　F. H. HUFFMAN.